J. P. COE.
TIRE CASING AND SUPPORTING MEANS THEREFOR.
APPLICATION FILED NOV. 7, 1921.
1,418,623.
Patented June 6, 1922.
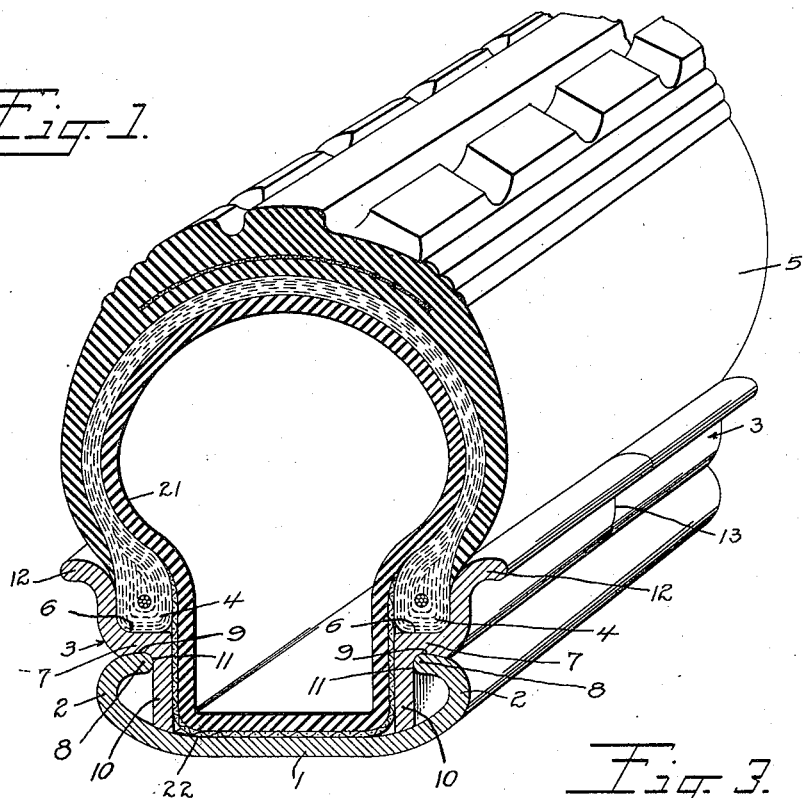
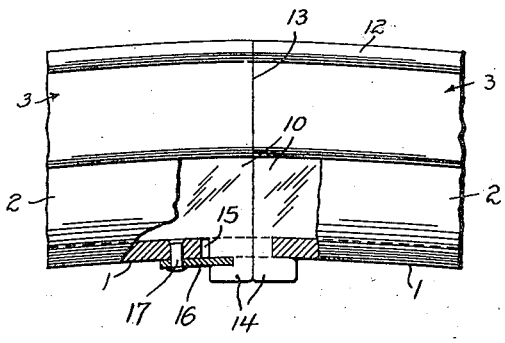
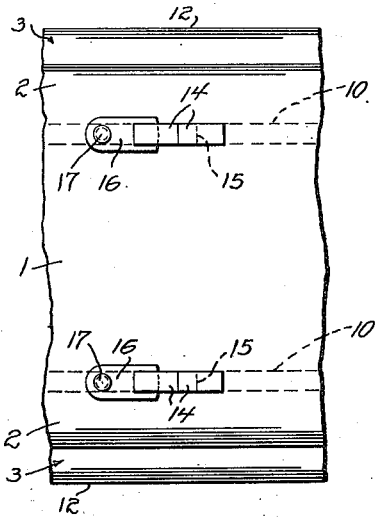
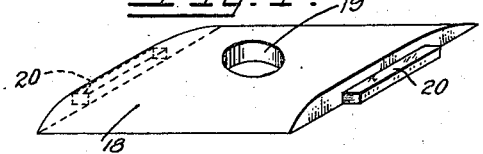
INVENTOR.
John P. Coe,
BY Ernest Hofstinson
HIS ATTORNEY.

UNITED STATES PATENT OFFICE.

JOHN PARKS COE, OF HASTINGS-ON-HUDSON, NEW YORK, ASSIGNOR TO MORGAN & WRIGHT, A CORPORATION OF MICHIGAN.

TIRE CASING AND SUPPORTING MEANS THEREFOR.

1,418,623. Specification of Letters Patent. Patented June 6, 1922.

Application filed November 7, 1921. Serial No. 513,229.

*To all whom it may concern:*

Be it known that I, JOHN PARKS COE, a citizen of the United States, residing at Hastings-on-Hudson, county of Westchester, and State of New York, have invented certain new and useful Improvements in Tire Casings and Supporting Means Therefor, of which the following is a full, clear, and exact description.

This invention relates to pneumatic tires and in particular to auxiliary rim construction for mounting a straight-side or inextensibly beaded casing on a clincher rim.

An object of the invention is to provide a straight-side or inextensibly beaded casing which, by means of auxiliary side-flanges, can be mounted upon a clincher rim without substantial alteration thereof. Further objects are to attain the above end with a casing that may be made shorter from bead around to bead without diminishing the cushioning volume of air and to provide a casing less expensive to manufacture. And another object of the invention is to obviate the troubles in manufacture and in use of clincher casings with extensible beads.

With the illustrated embodiment of the invention in mind and without intention to limit its scope more than is required by the prior art, the invention may be briefly described as consisting of a casing with inextensible beads larger than the beads of the supplanted clincher tire and of auxiliary side-flanges adapted to be mounted on the clincher rim between its side-flanges for holding the beads of the casing so that when an inner tube therewithin is inflated, the casing may be anchored securely to the clincher rim.

An embodiment of the invention is illustrated in the accompanying drawings in which:—

Fig. 1 is a perspective of a section of a casing of the present invention mounted on auxiliary side-flanges, resting upon a clincher rim, and Figs. 2 and 3 are side and bottom elevations, respectively, of part of a clincher rim and the auxiliary side-flanges, the former, partly in section, illustrating a suitable end-fastening construction for the side-flanges, and Fig. 4 is a perspective view of a spacing-block that may be used between a pair of auxiliary side-flanges.

In the drawings, a one-piece clincher rim 1 with integral flanges 2 is shown supporting auxiliary side-flanges indicated generally by the numeral 3, upon which rest the inextensible beads 4 of a straight-side casing 5. The latter may be made of superimposed laminations of fabric (preferably cord) and vulcanizable rubber composition. Its distance from bead around to bead may be somewhat less than that of the supplanted clincher casing but this dimension may be varied to meet requirements without departing from the principles of the invention.

The annular diameter of the beads 4 may be varied as desired, depending, of course, upon the construction of the side-flanges 3, and more particularly upon the diameter of a seat 6 constituted by a band-like approximately cylindrical portion 7 in the illustrated form thereof. In diameter, the beads 4 of the casing are larger than the beads of the replaced clincher tire and must, at least, be long enough circumferentially to be passed over the rim-flanges 2, in the well-known Dunlop "buttoned-on" fashion. Preferably, however, the casing is built, as shown, with its beads 4 larger in diameter than the rim-flanges 2.

The auxiliary side-flanges 3 may be supported upon the clincher rim 1 at any suitable point. They may be rested on the free inturned edges 8 of the rim-flanges 2, and to this end a groove 9 provided intermediately thereof on the inside of each band-like portion 7, immediately adjacent a depending flange 10, which at 11 is adapted to abut against the rim-flange and thereby to be restrained against lateral displacement. Each groove 9 has preferably an extensive bearing surface or seat so as to support and brace the auxiliary side-flanges in an upright position against flexing movement, more or less, about the free edge 8 of a rim-flange. Rising from the band-like portion 7 is a second flange 12, which is preferably made in the well-known straight-side form to prevent lateral displacement of the casing beads. This flange may be located as desired to either side of or in line with the depending flange 10, and is not necessarily offset exactly as shown, the distance between a pair of flanges 12 being variable to meet the requirements of the rim and casing. As the construction of clincher rims is standardized, the depending flange 10 may be made of a depth to either rest upon, or very closely approach fitting, the bottom channel in the clincher rim 1. As shown, however, the inner periphery of the flange 10 is made to barely clear the bottom of the clincher rim so that the groove or otherwise formed supporting seat 9 is the only face or part that requires precision in manufacture, ample tolerances being elsewhere allowable. Where, however, the inner periphery of the flange 10 is to constitute the supporting seat, it, of course, should be machined with precision.

One or both of the side-flanges may be split as indicated at 13, and thereat provided with depending, but oppositely directed, hooks 14, which may be passed through a slot 15 cut into the clincher rim 1, a latch 16 pivoted at 17 being provided to hold an auxiliary side-flange with its ends in the abutting relation shown. But any suitable means may be employed to hold the ends of the split side-flanges either to the clincher rim or each other, or the ends may be left free. Holding the ends of the side-flanges not only assists the stiffening action of the apron-like flanges 10 but guards as well against creeping and against twisting of the side-flanges when running on a flat tire. Creeping of the side-flanges when, for instance, the hooks 14 are omitted, may also be provided against by a spacing-block 18 having a valve-stem hole 19 and end-lugs 20 for engagement with notches (not shown) in side-flanges located at or between their ends.
An inner tube 21 of usual all rubber construction may be employed, but I prefer to protect the inner periphery against being pinched with a fabric strip 22 cemented or loosely positioned thereat and extending, as illustrated, from one bead of the casing to the other. The depending or inwardly extending flanges 10 of the auxiliary side-flanges close off the grooves defined by the inturned rim flanges and prevent the inner tube from protruding thereinto and being injured.

To assemble the illustrated construction on a clincher rim, one of the auxiliary side-flanges is first positioned, then the casing and inner tube may be readily passed over the other rim-flange, and then the second auxiliary side-flange is put in place. The inextensible beads 4 of the casing may be drawn over, at least partly, upon the seats 6 of the auxiliary side-flanges. Subsequent inflation of the inner tube will fully seat the beads of the casing, if not already so, and securely anchor the parts in their assembled operative relation.

In the foregoing, I have illustrated only the preferred form of construction. The principles of the present invention are not limited, however, to the precise details shown and described. The form of the two auxiliary side-flanges may be varied. They may be shaped to seat or fit upon the bottom of the clincher channel instead of upon the free edges of the clincher rims. The seats for the casing beads may be shifted inward or outward to any suitable extent and more or less radially. In the last mentioned case, for instance, the inner periphery of the flange 10 may be machined to fit the bottom of the clincher rim and the seat 6 located below a line connecting the free edges of the rim-flanges, which latter may then engage the restraining flange portion 12 to prevent lateral spreading of the casing beads. Obviously, also, the two auxiliary side-flanges may be conncted together by a web or band of metal to form a single supporting and anchoring member. In this case, the casing might be "buttoned-over" Dunlop fashion. These and other modifications are contemplated but for various reasons are not deemed as desirable as the construction disclosed in detail.

For a full understanding of the scope of the invention reference should therefore be made to the appended claims.

Having thus described my invention, what I claim and desire to protect by Letters Patent is:

1. A transversely split auxiliary side-piece for clincher rims having a substantially cylindrical portion, an inwardly extending flange adapted to close a tire bead groove of the clincher rim, and an outwardly extending tire retaining flange, the auxiliary side-piece being adapted to support and retain one side of a tire casing having inextensible beads when mounted on a clincher rim.

2. The combination with an unbroken clincher rim having inturned flanges, of a tire casing having inextensible beads of a diameter at least permitting their being "buttoned-over" the rim-flanges, an inner tube, a pair of split auxiliary side-flanges, each of said auxiliary side-flanges having an approximately cylindrical seat for an inextensible bead of the casing, a tire retaining flange extending outwardly from said cylindrical seat, and means located inwardly from said seat for closing a tire bead groove defined by an inturned rim-flange and preventing the inner tube from being inflated thereinto.

3. The combination with a one-piece clincher rim having inturned flanges, of a pneumatic tire casing having inextensible beads of a diameter greater than the free edges of said inturned rim-flanges, an inner tube, and means for holding the casing by its beads mounted on the clincher rim.

4. The combination with a one-piece clincher rim having inturned flanges, of a pneumatic tire casing having inextensible beads of a diameter greater than the free edges of said inturned rim-flanges, an inner tube, and auxiliary side-flanges detachably secured to the clincher rim for holding the casing.

5. The combination with a one-piece clincher rim having inturned flanges, of a pneumatic tire casing having inextensible beads of a diameter greater than the free edges of said inturned rim-flanges, an inner tube, and auxiliary detachable side-flanges, said auxiliary side-flanges being formed with seats for holding the beads and for supporting engagement with the clincher rim.

6. The combination with a one-piece clincher rim having inturned flanges, of a pneumatic tire casing having inextensible beads of a diameter greater than the free edges of said inturned rim-flanges, an inner tube, and split auxiliary side-flanges, each of said auxiliary side-flanges having a seat for a bead and therebeneath a supporting face for engaging a rim flange.

7. The combination with a one-piece clincher rim having inturned flanges, of a pneumatic tire casing having inextensible beads of a diameter greater than the free edges of the inturned rim-flanges, an inner tube, and split auxiliary side-flanges of approximately Z-bar cross-section.

8. The combination with a one-piece clincher rim having inturned flanges, of a pneumatic tire casing having inextensible beads of a diameter greater than the free edges of the inturned rim-flanges, an inner tube, split auxiliary side-flanges, and means for holding the ends of said auxiliary side-flanges.

9. The combination with a one-piece clincher rim having inturned flanges, of a pneumatic tire casing having inextensible beads of a diameter greater than the free edges of the inturned rim-flanges, an inner tube, and split auxiliary side-flanges of approximately Z-bar cross-section provided intermediately with a groove for supporting engagement with a free edge of the rim-flanges.

10. The combination with an unbroken clincher rim having inturned flanges, of a tire casing having inextensible beads of a diameter at least permitting their being "buttoned-over" the rim flanges, an inner tube, and split auxiliary side-flanges upon which the casing is adapted to be seated and secured to the clincher rim, said auxiliary side-flanges having portions extending inwardly to the base of the clincher rim substantially continuous with the inside face of the casing and enlarging the cavity occupied by the inner tube.

Signed at New York, county of New York, and State of New York, this 4th day of November, 1921.

JOHN PARKS COE.